Nov. 7, 1961 W. G. HICKS 3,008,120
CONVERSION OF VELOCITY WELL-LOGGING DATA
Filed June 21, 1956 4 Sheets-Sheet 1

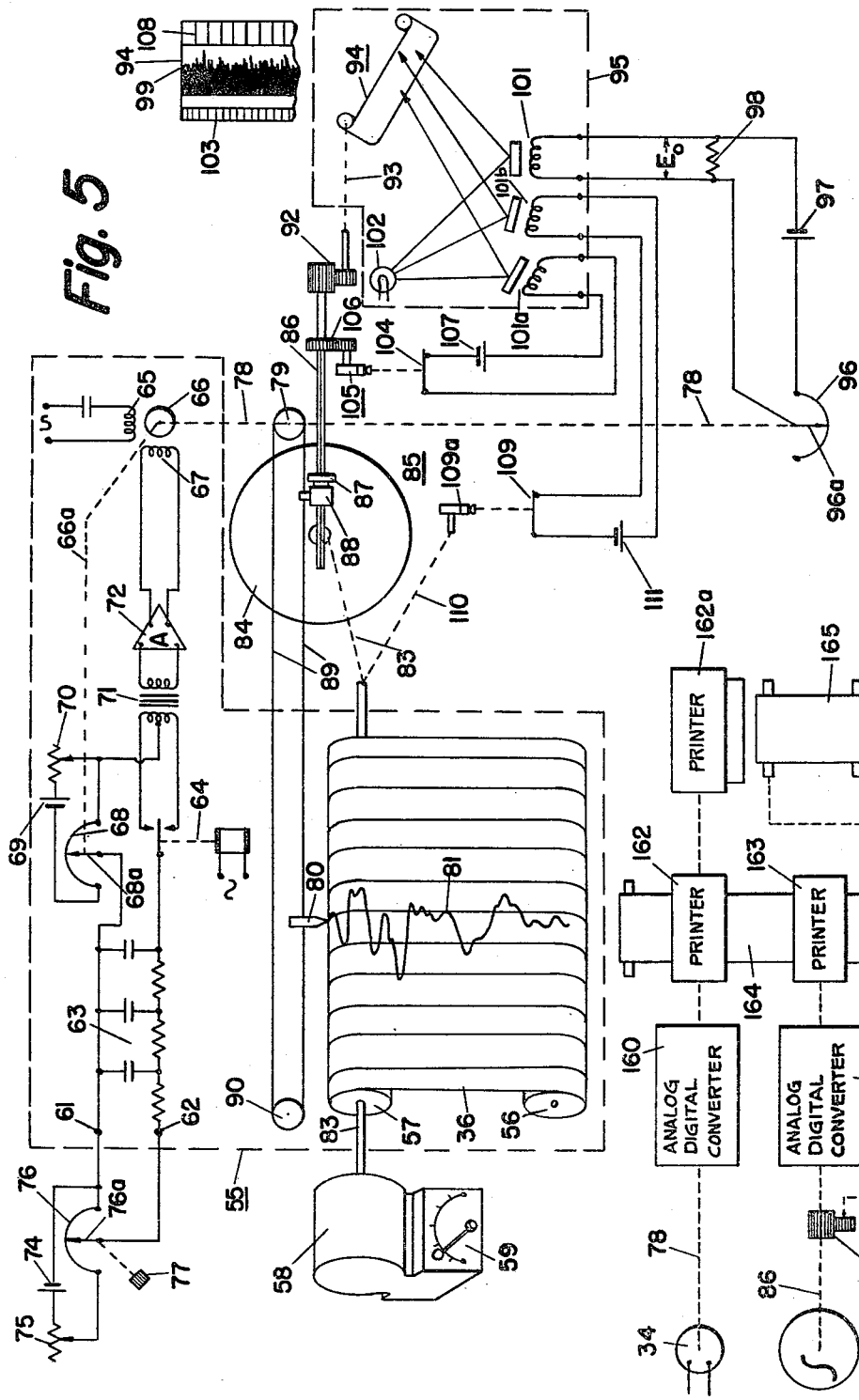

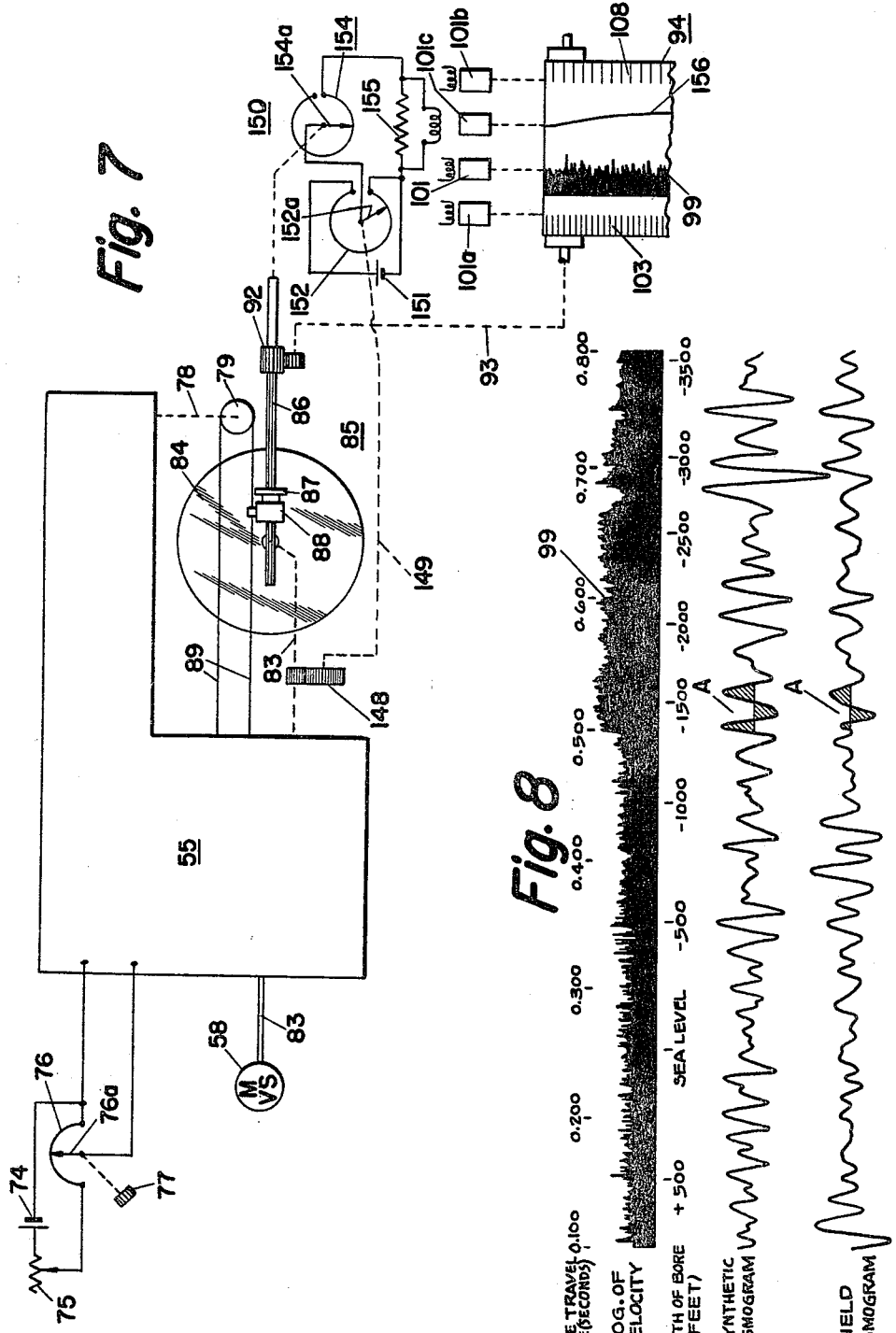

३,००८,१२०
Patented Nov. 7, 1961

3,008,120
CONVERSION OF VELOCITY WELL-LOGGING DATA
Warren G. Hicks, Grand Prairie, Tex., assignor, by mesne assignments, to Socony Mobil Oil Company, Inc., New York, N.Y., a corporation of New York
Filed June 21, 1956, Ser. No. 592,925
10 Claims. (Cl. 340—18)

This invention relates to methods and apparatus for extending the usefulness of well-logging data, more particularly, continuous velocity well-logging data, and has for an object the provision of data-converting systems and methods by means of which the information obtained during well-logging operations or appearing on records of continuous velocity well-logging may be transformed in manner to provide additional information in respect to subsurface lithology and which serve as additional tools for the interpretation of field seismograms and which may also be used in the generation of synthetic seismograms.

As better instruments have become available, there has also been a growing appreciation of the relationships between the information obtained by continuous velocity well-logging methods and the information yielded by conventional seismic methods. Seismograms produced by the well-known reflection seismograph methods continue to be the principal source of information relied upon by geologists in their search for oil deposits. Such seismograms, though costly, have been made over extended areas of the country where oil production has seemed at all likely and exploration continues throughout the world in an endeavor to discover new production. Accordingly, any new aids which assist the geologists or the seismologists in the interpretation of seismograms, new or old, are of great importance. The principal purpose of the conventional reflection seismogram is to provide information, by way of distinctive reflections of acoustic energy, as to the location, inclination and character of reflecting interfaces throughout the depths where oil is likely to be encountered. Thus, as acoustic energy is applied to the earth, as by a dynamite explosion, the resultant wave moves downwardly until it passes through a part of the earth where the acoustic impedance changes. Because of the change in the acoustic impedance a part of the energy is reflected upwardly. The phase and amplitude of the reflected energy will depend upon the direction of change and degree of contrast between the adjacent layers forming the interface. In some sections of the country, the reflections as detected by geophones at the earth's surface provide the desired information but in many cases multiple reflections between subsurface interfaces, ground waves and, to some extent, "noise" confuse the seismogram to a point where it may be extremely difficult, if not impossible, accurately to locate even the known reflecting interfaces.

Since the energy reflected by subsurface interfaces is dependent upon change of acoustic impedance or the magnitude of the reflection coefficient, a measurement in a bore hole of the velocity along small selected lengths of the bore hole has been found to provide explicit information in respect to the change of the acoustic impedance of the formations along the bore hole. In this way the reflecting interfaces may be accurately determined.

The correlation attained between the continuous velocity well-logging data and the seismogram appears to justify the conclusion that the conventional seismogram in its idealized form would comprise a record substantially identical with that produced by the continuous velocity well-logging method. Since an idealized field seismogram is not yet obtainable, it is possible, in accordance with the present invention, to utilize the data from a continuous velocity well-logging survey to produce synthetic seismograms of an idealized character which are not only useful in themselves in locating and yielding information as to the character of subsurface formations but they are also useful in the interpretation of conventional seismograms. For example, the synthetic seismograms made from continuous velocity well-logging data in but one or two available well bores can be applied to conventional seismograms taken over a wide area where the lithology is generally the same as that in the vicinity of the available well bores.

In accordance with the present invention provisions have been made for the conversion of $\Delta t$, the quantity representing the travel time of acoustic energy between two transducers spaced a fixed distance apart and together moved along the well bore to other quantities derivable therefrom such, for example, as acoustic velocity, the logarithm of velocity, average velocity and particularly to produce a record of the logarithm of velocity against a time base corresponding with that of the conventional seismograph. The latter record may be phonographically reproducible in form convenient for use in the production of the synthetic seismograms.

The term "recording medium" refers to a media upon which data-representing signals may be recorded and is used to mean a record which may be utilized to produce electrical pulses representative of the instantaneous magnitudes of a transient wave which has been recorded and by means of which the transient wave can be analyzed as to its component parts and again recorded in terms of the whole or separate parts thereof. Thus, under this definition it will be seen that wax recordings, magnetic records on steel or iron wire or an magnetic tape and the like are considered full equivalents one to the other and to photographic recording media including variable area and variable density photographic film.

More particularly, the present invention is concerned with the use made of a control function which in relation to a scale corresponding with the depth of a well bore varies in accordance with the incremental travel time of acoustic pulses over short earth segments of constant length and corresponding with the spacing between said transducers. From the control function there is derived a first output function which increases in accordance with the integral of the control function with respect to the depth of the well bore. There is also derived from the control function a second output function which varies preferably in accordance with the logarithm of the reciprocal of the control function. The second output function is recorded with respect to a time base corresponding with that of a conventional seismogram, i.e., one which is linear in terms of increasing magnitude of said integral of said control function.

For further objects and advantages and for a more detailed discussion of background material and for different ways of carrying out the methods of the present invention, reference is to be had to the following description taken in conjunction with the accompanying drawings which include diagrammatic representations of apparatus embodying the invention. In the drawings:

FIG. 1 diagrammatically illustrates a system embodying the invention;

Figure 4:
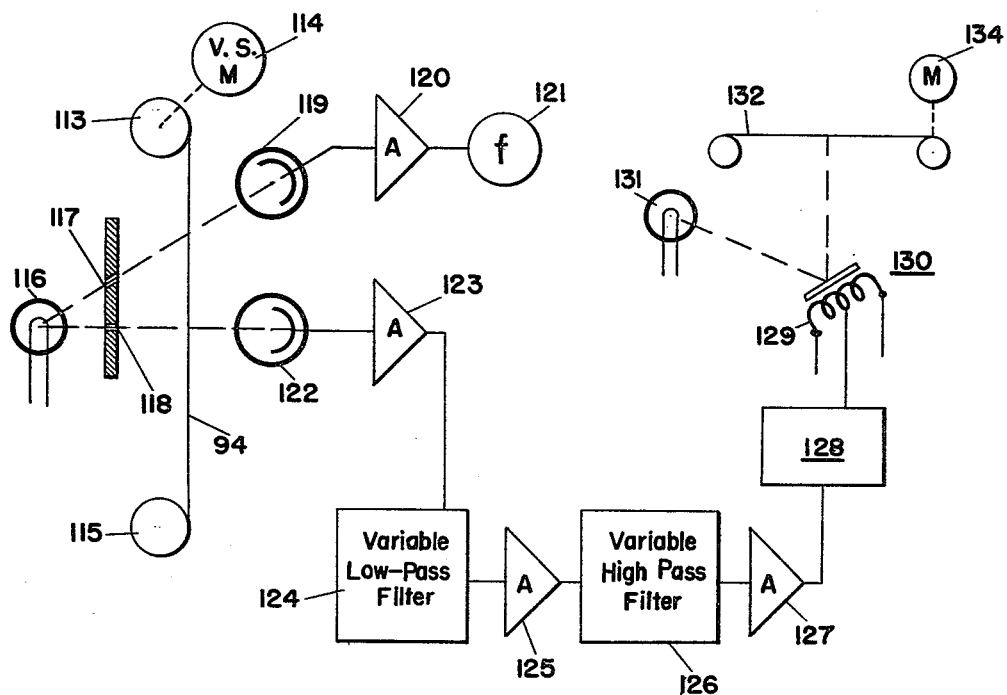

FIG. 4 diagrammatically illustrates a system for producing synthetic seismograms;

FIG. 5 illustrates a modification of the invention particularly useful in connection with existing velocity well-logging data;

FIG. 6 diagrammatically illustrates the manner in which information from the several modifications of the invention may be presented in digital form;

FIG. 7 diagrammatically illustrates a further modification of the invention; and FIG. 8 presents a comparison between a record of the logarithm of velocity made in accordance with the present invention, a synthetic seismogram produced therefrom, and a conventional field seismogram.

Referring to the drawings, the invention will first be described in connection with FIG. 1 which schematically illustrates one application of the invention to the transformation into more useful forms of the continuous velocity well-logging data produced by an exploring unit 10 disposed in a well bore 15. There will later be described the application of the invention to existing velocity well-logging data, particularly in connection with conventional records thereof.

The exploring unit 10 may be of the type disclosed in Summers et al. Patents 2,737,639 and 2,742,629 or as shown in copending application S.N. 346,593, now U.S. Patent No. 2,757,358, filed April 3, 1953 by John O. Ely and entitled "Mechanically Coupled Acoustic Well-Logging System." While the foregoing patents and said application disclose a single transmitter and a single receiver, a two-receiver system such as schematically illustrated in FIG. 4 of Summers Patent 2,704,364 can also be utilized in the manner there set forth.

Figure 1:
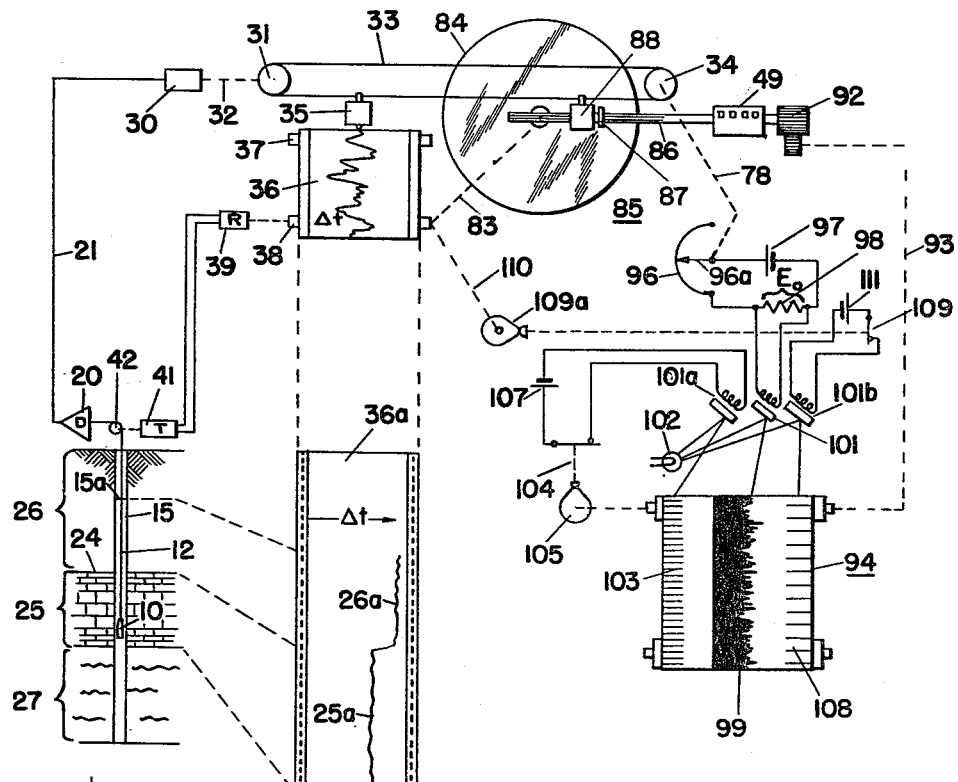
Figure 2:
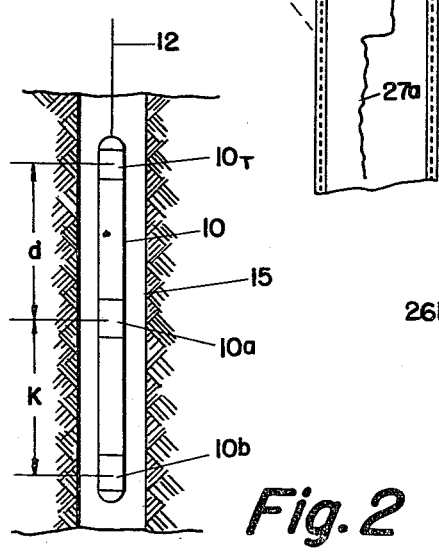
FIG. 2 illustrates one form of an exploring unit within a well bore.

As best shown in FIGS. 1 and 2, the exploring unit 10 is supported from a cable 12 and by means of suitable hoisting equipment including a measuring wheel or sheave 42 is moved, preferably at uniform speed along the length of the well bore 15. The exploring unit itself includes a transmitter or acoustic generator 10T and two receivers 10a and 10b. Use of two receivers in velocity well-logging takes into account the total travel time through liquid paths in the bore hole 15 of an acoustic pulse produced by the transmitter 10T. More particularly, the operation effectively subtracts from the total travel time of the acoustic pulse from the transmitter 10T to the remotely located receiver 10b the total travel time from the transmitter 10T to the adjacent receiver 10a. The total travel times referred to include the travel time through the liquid path from the transmitter to the adjacent earth formation and from the adjacent earth formation through the liquid path to each of the receivers 10a and 10b. By subtracting the total travel times as indicated above, the travel times through the liquid paths and the separation distance $d$ between the transmitter 10T and the first receiver 10a are cancelled and there remains only the travel time $\Delta t$ of the acoustic pulse through the distance K, the separation between the receivers 10a and 10b as measured from points in the adjacent earth strata opposite these two receivers.

The transmitter 10T generates pulses of acoustic energy with a time interval therebetween adequate for the traverse by the acoustic energy from transmitter 10T to the remotely located receiver 10b through the lowest-velocity formation likely to be encountered. The foregoing subtraction is effectively accomplished by initiating a timing operation upon arrival of each acoustic pulse at the receiver 10a and measuring the time interval required for travel of the acoustic energy from the receiver 10a to the receiver 10b. In brief, the receiver 10a initiates the timing operation and the receiver 10b either terminates it or provides a direct indication of the lapsed time, $\Delta t$. This effectively represents a subtraction of the time for the travel of the pulse from 10a to 10b and thus the time intervals required for travel through the mud and liquid adjacent each of the receivers 10a and 10b are eliminated and there remains the travel time, $\Delta t$, the interval required for travel of the acoustic energy over the distance K.

The output from the exploring unit 10 is applied to the amplifier-detector 20 and associated control arrangements as fully described in said Summers Patent 2,704,364 for the production of an output voltage at the output circuit 21 representative of the time interval $\Delta t$ required for each pulse of acoustic energy to traverse the distance K in the formation adjacent the receivers. Since velocity is equal to distance divided by time and since the distance is constant, i.e., equal to K, and there is measured $\Delta t$, it will be seen that the velocity of the seismic energy through the earth formation will be equal to distance K divided by $\Delta t$, i.e.

$$v = \frac{K}{\Delta t}; \quad \Delta t = \frac{K}{v} \tag{1}$$

where $v$ is incremental velocitiy.

From the foregoing it will be apparent that the output voltage applied by way of the circuit 21 will be representative of the incremental formation velocity between the transmitter and receiver and over the length K of the strata adjacent the bore hole. With the exploring unit 10 in the position illustrated, the measurement will be of the formation velocity of a part of the strata or formation 25. The strata 25 are located between a surface strata 26 and a deeper strata 27. For convenience, it will be assumed that the regions or interfaces between the respective strata 25, 26 and 27 are each marked by a substantial contrast in velocity characteristics and that the contrasts are characterized by an increase in velocity with an increase in depth.

The voltage representing the formation velocity characteristics is applied by way of the output circuit 21 to a measuring apparatus 30 which includes a driving means or a pulley 31, the driving connection 32 being indicated by a broken line. The measuring apparatus 30 may be of conventional form such, for example, as a recorder of the type manufactured and sold under the trademark "Speedomax" by the Leeds & Northrup Company and is also shown in Williams Patent 2,657,349, dated October 27, 1953. A driving cord or belt 33 driven by the pulley 31 is supported on an idler pulley 34 and positions a pen-index carriage 35 relative to a record chart 36. In addition to the scale provided on the chart, a second scale (not shown) can be associated with an index for direct reading purposes.

From the measuring pulley 42, there extends a driving connection to a motion-transmitter 41, which may be a transmitting Selsyn. The transmitter 41 drives a receiving device 39 which may be a receiving Selsyn which in turn has an output shaft, which may be from a torque amplifier, for driving the record chart 36 as a function of the position of the exploring unit 10 within the well bore.

With the system operating as thus far described it will be seen that there is produced on the record chart 36 the control function $\Delta t$ plotted against depth of the well bore. In many cases the record will be irregular and as appearing on the chart 36. An idealized record 36a is shown opposite the well bore 15 better to illustrate the fact that the control function in terms of $\Delta t$ extends horizontally from the left-hand side or axis of the chart. Part 26a of the record illustrates the relatively large time interval required for acoustic or seismic energy to travel through the low-velocity formation 26. As the exploring unit moves through the higher velocity formation 25 the time interval is reduced and this is shown by the section 25a of the chart which is nearer to the left-hand axis or margin thereof. As the exploring unit 10 moves into the higher velocity formation 27, the section 27a of the chart 36a appears still nearer the left-hand margin indicating a further decrease in $\Delta t$ and which, of course, represents a higher velocity.

It is to be observed from the record 36a that the initial section 26a has its origin somewhat below that part of the chart representing the surface of the earth. The beginning of section 26a corresponds with the level of liquid within the well bore, as at 15a. In general, the acoustic exploring unit 10 must be immersed in a liquid medium in order to couple the acoustic energy to the formation as between the transmitter and receivers. Accordingly, the point 15a is taken as the reference or datum point $Z_0$ below the earth's surface.

The driving cord 33 besides positioning the pen-index carriage 35 also positions a carriage 88 of an integrator 85 relative to a disc 84. The output of the instrument 30 is likewise transmitted by way of the pulley 34 and the driving connection 78 to an adjustable contact 96a of the rheostat or variable resistor 96.

The integrator 85 has been illustrated as of the type described in copending application S.N. 322,718, now U.S. Patent No. 2,905,258, filed November 26, 1952 by Robert A. Broding. While the system of his application has features common to the invention of the present application, the transformations of the control function substantively differ as will appear in the following description.

With the disc 84 of the integrator 85 driven by way of the mechanical connection 83 in accordance with the position of the exploring unit 10 within the well bore 15, and with the carriage 88 positioning on the splined shaft 86 a driving wheel 87 relative to the disc 84, the shaft 86 will be driven as a function of the total travel time T of the acoustic energy through the formations adjacent the well bore. In accordance with said Broding application S.N. 322,718 the integrator output shaft is utilized to position a pen relative to a chart driven in accordance with the depth function to produce a record of total travel time against depth.

In accordance with the present invention a phonographically reproducible record is produced on a recording medium 94 which may be an unexposed film. The film 94 is driven by the mechanical connection 93 extending from gearing 92 driven by the output shaft 86 of the integrator. Thus the recording medium 94 is driven in accordance with the integral of the incremental travel time $\Delta t$, i.e., in accordance with total travel time T. Total travel time T is the time required for a pulse to travel from the top to bottom of an earth section over which a well log is integrated.

There is also produced a second function, the latter being recorded on the recording medium 94. More particularly record 99 is representative of the second function which is the logarithm of the formation velocity. The manner in which the logarithm of velocity is obtained will be described after first considering some additional background.

Acoustic velocity logging data converted from a plot of $\Delta t$ as a function of depth to a plot of the logarithm of velocity as a function of total travel time is useful for purposes of interpreting conventional seismograms since the data is thus presented on the same scale, travel time, as a seismogram. Further, such a record is useful in the generation of synthetic seismograms and in view of the latter use an understanding of the correlation of such seismograms and those taken by conventional seismic methods will now be developed.

Figure 3:
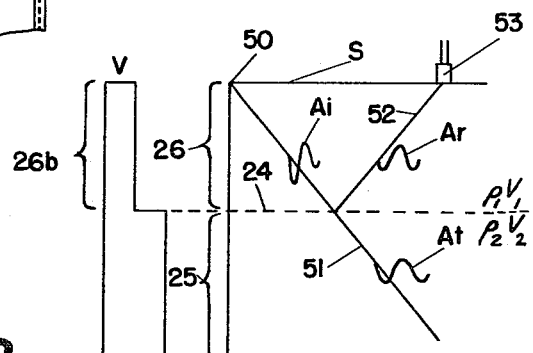
FIG. 3 illustrates graphs explanatory of some of the background theory.

Referring to FIG. 3 the earth's surface is represented at S with a geophone 53 located thereon. If seismic energy be released at the point 50, as by the explosion of dynamite, an acoustic wave or pulse will travel downwardly from the earth's surface S, as along the path indicated by the line 51. The pulse of acoustic energy in terms of motion of earth particles is illustrated as the wave $A_i$. It proceeds from the earth's surface S until striking an interface, as between the strata 25 and 26. During the initial travel path the velocity is low as indicated by the graph at 26b. At the interface 24 a part of the acoustic energy is reflected upwardly, for example, along the line 52 to the geophone 53. The reflected energy in terms of motion of earth particles is illustrated by the wave $A_r$. A part of the incident energy or wave $A_i$ continues downwardly as the transmitted wave $A_t$. The ratio of the amplitude of the reflected wave $A_r$ to that of the incident wave $A_i$ is defined as the reflection coefficient R. Thus, $$R = \frac{A_r}{A_i} \qquad (2)$$

The reflection coefficient can also be expressed in terms of the density and of the velocity of the acoustic energy through the strata respectively above and below the interface 24. Accordingly, $$R = \frac{\rho_2 v_2 - \rho_1 v_1}{\rho_2 v_2 + \rho_1 v_1} = \frac{A_r}{A_i} \qquad (3)$$

where $\rho$ = density of strata
$v$ = velocity of acoustic energy through said strata.

The density-velocity products of the foregoing equation define the acoustic impedance of the earth. Thus the difference in the acoustic impedance above and below the interface 24 will determine the magnitude fo the reflection coefficient and the amplitude of the reflected wave $A_r$. Equation 3 also shows that when the product $\rho_1 v_1$ is less than the product $\rho_2 v_2$, R is positive. This means that $A_r$ will have the same phase or instantaneous polarity as $A_i$. This is the condition illustrated in FIGS. 1 and 5 where the interface 24 is between an upper layer of lower velocity and a lower layer 25 of higher velocity. When $\rho_1 v_1$ is greater than $\rho_2 v_2$, R will have a negative sign. $A_r$ will be opposite in phase to $A_i$ and its instantaneous polarity will likewise be opposite. This signifies that the interface lies between an upper bed of higher velocity and a lower bed of lower velocity.

Since the geophone 53 responds to the up-traveling reflected wave $A_r$, Equation 2 can be rewritten in terms of $A_r$ and it can also be simplified by introducing an approximate expression for the reflection coefficient. For example, Equation 3 may be rewritten as follows:

$$A_r = \frac{\Delta(\rho v)}{2(\rho v)} A_i \qquad (4)$$

where $\Delta$ is "incremental change in."

Equation 4 is a sufficiently close approximation to Equation 3 as to make it quite adequate for the seismic studies here under consideration. Further inspection of Equation 4 will reveal that it takes the form of the general equation of $$\frac{dx}{x} = \Delta(\log \text{ of } X) \qquad (5)$$

Accordingly, applying this general equation, Equation 4 may be rewritten as follows:

$$A_r = \frac{A_i}{2} [\Delta \log (\rho v)] \qquad (6)$$

Equations 3, 4 and 6 are in terms of the product of the density and the acoustic velocity in the formations under consideration. With density given in terms of grams per cubic meters and velocity given in terms of meters per second, attention will now be given to a general equation which approximately relates the non-linear relationship between density and velocity, namely, $$\rho = mv^n \qquad (7)$$

In Equation 7 $m$ will be given in terms of gram seconds per meter to the fourth power and $n$ will be an exponent required because of the aforesaid non-linear relationship between density and velocity. If both sides of Equation 7 now be multiplied by $v$, velocity, Equation 8 is obtained.

$$\rho v = mv^{n+1} \qquad (8)$$

Now taking the logarithm of both sides of Equation 7, the following equation is obtained.

$$\log(\rho v) = \log m + (n+1)\log v \quad (9)$$

Assuming both general terms $m$ and $n$ to be substantially constant Equation 9 can be simplified to the following:

$$\log(\rho v) \propto \log v \quad (10)$$

From Equation 10 it will be seen that the logarithm of velocity is proportional to the logarithm of the product of velocity and density. This relationship is sufficiently accurate for the correlation needed for the application of the present invention.

Referring again to FIG. 1, there will now be explained the manner in which the network including the resistors 96 and 98 and the source of supply or battery 97 converts the velocity function into the logarithm of velocity. The latter function, represented by the potential difference across the resistor 98, is applied to the coil of a galvanometer 101 which exposes the film 94 by light received from a source 102 to provide the record which varies laterally of the chart or film 94 in accordance with the quantity proportional to the logarithm of velocity.

The foregoing network in terms of the potential difference across the resistor 98 obeys the following equation:

$$E_0 = IR_{98} \quad (11)$$

Where $E_0$ equals the potential difference across output resistor 98, $I$ is the series current through resistor 98 and $R_{98}$ is the resistance of resistor 98.

The series current is equal to $$I = \frac{E_{97}}{R_{96}+R_{98}} \quad (12)$$

Substituting Equation 12 and Equation 11 there is obtained the following:

$$E_0 = \frac{E_{97}R_{98}}{R_{96}+R_{98}} \quad (13)$$

If the output resistor 98 be made very much less than that of the resistor 96, its effect upon Equation 13, particularly in the denominator thereof, will be small. Accordingly, Equation 13 can be rewritten as follows, where the sign $\cong$ means approximately equal to:

$$E_0 \cong \frac{E_{97}R_{98}}{R_{96}} \cong \frac{C}{R_{96}} \propto \frac{1}{\Delta t} \quad (14)$$

Since the product of $E_{97}$ and $R_{98}$ will be constant it may be represented as $C$ and accordingly it will be seen from Equation 14 that the output voltage $E_0$ will vary in a reciprocal fashion with respect to the change in value of the resistor 96. It follows that the output voltage $E_0$ varies as the formation velocity since Equation 1 shows $$\frac{K}{\Delta t}$$

is equal to velocity $V$.

If the product of two variables be equal to the constant, a graph of one with respect to the other will be a hyperbola. Thus a graph of $E_0$ and the reciprocal of $R_{96}$ will be of hyperbolic form. This fact is significant since if the resistance of resistor 98 be made to approach that of resistor 96, the hyperbola will be distorted and will approach a logarithmic form. It has been found that if the ratio of the fixed value of resistor 98 to the maximum value of resistor 96 be the same as the ratio of 21 is to 30, then for all future variations in the value of resistor 96, $E_0$ will vary approximately as the logarithm of $$\frac{1}{\Delta t}$$

Mathematically, when $$\frac{R_{98}}{R_{96}} = \frac{21}{30}, \text{ then } E_0 \cong \log\frac{1}{\Delta t} \cong \log v \quad (15)$$

It has now been demonstrated how the formation velocity as represented by $\Delta t$ has been transformed into an output voltage $E_0$ varying in accordance with the logarithm of velocity. It has been further demonstrated how the phonographically reproducible record 99 is produced with the variations transverse of the recording medium 94 proportional to the logarithm of velocity.

It will be remembered that the recording medium 94 is driven from the output shaft 86 of the integrator 85 through the gearing 92 in order to establish a time base for the log $v$ corresponding with the time base of a conventional seismogram. In the conventional seismogram, time is measured from the instant of generation of the seismic waves over the interval required for the resulting acoustic wave to travel to the reflecting surface or interface 24 and thence to the geophone 53, FIG. 3. Thus there are two travel times involved, one for the incident wave $A_i$, and one for the reflected wave $A_r$, and these two travel times are taken as equal. A mathematical correlation between the conventional seismogram and the velocity function as appearing on the record 36 is as follows:

$$T = \int_{z_0}^{z_1} \frac{1}{v} dz = \int_{z_0}^{z_1} \frac{\Delta t}{K} dz \quad (16)$$

where $T$ is the total travel time from the datum plane $z_0$ to the depth of interest at $z_1$, $K$ is the spacing of the transmitter and receiver elements in the logging tool (generally a spacing selected in the range of from 4 to 6 feet), $\Delta t$ is the logged interval travel time, and $v$ is the interval velocity through the distance $K$, FIG. 2, at depth $z_1$.

Since the time interval $\Delta t$ is the function which positions the carriage 88 and wheel 87 along the disc 84, and since the disc 84 is driven in accordance with a depth function, it will be seen that the integrator 85 performs the integration called for by Equation 16. The gears 92 step up the rotation of the connection or shaft 93 to twice the rotation of the shaft 86. This doubles the one-way travel time so that the time base on the recording medium 94 corresponds with the time base for two-way travel time of the conventional seismogram.

Concurrently with the production of the record 99 on the recording medium 94 additional data may be recorded. Since the recording medium 94 is driven in accordance with the two-way travel time of an acoustic pulse if produced at the datum or reference line 15a, a cam 105 may be driven through an extension of the mechanical connection 93 to operate a switch 104 to open and close the circuit to a galvanometer coil at 101a for deflection in accordance with the current supplied by the battery 107. Each time the switch 104 is closed the galvanometer produces a line of predetermined length on the recording medium 94. The cam 105 is driven at a speed such that the resultant timing markers correspond with those utilized on the conventional field seismogram. Thus the timing lines or markers 103 may appear with a spacing representing each 100th of a second.

By means of a cam 109a driven by connection 110 from the driving roll 38 in accordance with the depth function, a switch 109 is periodically actuated to produce from battery 111 deflection of the mirror of the galvanometer 101b to produce on the recording medium 94 a series of lines 108 forming a depth scale. The speed of cam 109a will determine the spacing of the depth markers 108. These may be representative of any selected distance, for example, 500 feet. Accordingly, with the additional scales or markers 103 and 108, the record 99 has additional usefulness since by reason of both the timing markers 103 and the depth markers 108 it may be readily correlated with a conventional field seismogram. Besides changing the speed of operation of cams 109a and 105 as by gearing, twice as many markers may be provided by doubling or providing two crests instead of the single crest which has been illustrated on each cam.

It will sometimes be desirable to provide the timing markers 103 spaced one from the other to generate 60 cycle pulses when the recording medium 94 in the form of a developed film is to be operated at a particular speed on the reproducing equipment.

Referring now to FIG. 4, the recording medium 94 in the form of a roll of developed film is illustrated as passing to a driving roller 113 driven by a variable speed motor 114, from an idler roller 115. A light source 116 directs a beam of light through two slits 117 and 118. The light through the slit 117 is arranged to pass through the markers 103, FIG. 1, spaced apart one from the other to produce a 60 cycle output from a photocell 119 and an amplifier 120 as read upon the frequency meter 121 with the speed properly adjusted to 60 cycles. A photocell 122 receiving light through the slit 118 will reproduce the record 99 at the exact two-way travel time. In this manner the reproduced record will have a time-base corresponding with the time base of a field seismogram.

Since the reproduction of the record 99 will produce an output signal from the photocell 122 varying with the logarithm of the velocity, it will be understood from Equations 3, 6 and 10 that this output signal will likewise be representative of the variation in the reflection coefficient. Accordingly, if there be combined with that output signal an input signal representative of the generation of acoustic energy it can be anticipated that the output from the amplifier 123 will vary in accordance with an idealized response from the earth. In FIG. 4 it can be assumed that a unit input function is combined with the output signal though it is to be understood that input functions other than unity may be utilized.

The output from the photocell 122 is passed through an amplifier of the cathode-follower type and applied to a variable low pass filter 124 and thence to a second amplifier 125 of the cathode-follower type. After passing through a variable high pass filter 126 and a pentode type of amplifier 127 the output signal is applied through an RC coupling network 128 to the galvanometer coil 129 of a galvanometer 130 which from light source 131 produces a synthetic seismogram on a recording medium 132 which may be a sensitized paper. The paper or medium 132 is driven by a motor 134 so that the length of the synthetic seismogram made during the completion of the scanning of the record 99 will be the same as that of a field seismogram.

In FIG. 8 there has been reproduced a fractional part of the record 99 and it bears the label "log. of velocity" this being, of course, a record of the logarithm of velocity with a time base the same as that part of a "field seismogram" which covers the same depth as the "log. of velocity." Intermediate the two records appears a "synthetic seismogram" made in accordance with the procedure generally outlined in connection with FIG. 4. If the field seismogram be examined in the absence of the other two records, it will be difficult to recognize a significant reflection in the region indicated at A. Nevertheless the region A is a significant one since as appears in the "log. of velocity" there is at the region A an abrupt and substantial change in the velocity characteristics of the subsurface strata. An examination of the synthetic seismogram indicates a significant reflection at the region A but one which is not as unique as sometimes appears on field seismograms. However, in reviewing the field seismogram, the synthetic seismogram and the "log. of velocity," the reflection at A on the field seismogram may be identified and thereafter used with some certainty as to the existence of the subsurface reflecting interface. The use made of the records in FIG. 8 is to be taken as exemplary only. For example, both the synthetic seismogram and the field seismogram were generated after the signals had passed through a filter having a bandwidth of approximately one octave, namely, from about 30 to 66 cycles per second. By varying the filtering of the synthetic seismogram and selecting field seismograms differently filtered to emphasize other frequencies, different correlations can be secured. These are representative of variables which those skilled in the art understand and will apply in practicing the invention.

Thus far the invention has been described in terms of data taken in the field, i.e., during the making of the velocity log of the well bore 15. The invention has also been described largely in terms of photographic procedure. It is to be understood that magnetic recordings may be made instead of using the photographic method described, and other recording media may be used, the principal purpose being the production of instantaneous values representative of the logarithm of velocity against a time base of twice travel time; preferably a record like the record 99.

Since many well bores have been exploded and velocity logs made therein, and since it will frequently be desirable to produce the phonographically reproducible records on recording media 94 at the home office or laboratory, there will now be explained in connection with FIG. 5 the production of the records 99, 103 and 108 from the velocity log 81 of record 36, the record having been made by an exploring unit such as illustrated in FIGS. 1 and 2.

The record or chart 36 is mounted upon a roller 56 and threaded onto a driving roller 57 which is driven by variable speed motor 58. The speed of the driving roller 57 is under the control of a speed regulating means 59. The pen-carriage 80 corresponds with the pen-carriage 35 of FIG. 1 but has been given a different reference character since the pen or index carried by the carriage 80, under manual control, is moved to the right or to the left to follow the velocity curve 81. The carriage 80 is driven by means of a driving cord 89 threaded over an idler pulley 90 and a driving pulley 79. Attached to the driving cord 89 is the carriage 88 of the integrator 85. The disc 84 of the integrator is driven by the mechanical connection 83 representing an extension of the shaft of the motor 58. Accordingly, it will be seen that the integrator 85 has its driven wheel 87 positioned radially of disc 84 in accordance with the velocity function $\Delta t$ which forms the trace 81 while the disc 84 is driven in accordance with the depth function.

In accordance with broader aspects of the invention, the pen-carriage 80 can be driven to follow the graph 81 in accordance with curve-tracing mechanisms of any suitable kind. One form of a suitable mechanism comprises a servo-mechanism 55 which positions the carriage 80 to follow the graph 81. The carriage 80 is moved to the right or to the left along the chart 36 in accordance with the rotation of a control knob 77 arranged to position a movable contact 76a with respect to a resistor 76, preferably of the slidewire type. The resistor 76 and its adjustable contact form with a series resistor or rheostat 75 and a battery 74 a potentiometer for developing an input voltage across the input terminals 61 and 62 of the servo-mechanism. The servo-mechanism includes many features of the instrument available on the market under the trademark "Speedomax" and illustrated in Williams Patent No. 2,657,349. It includes a balancing slidewire or resistor 68 having its adjustable contact 68a driven through mechanical connection 66a from the motor 66. The motor has a power winding 65 energized from a suitable alternating-current source of supply by way of a series capacitor. The motor also has a control winding 67 energized from an amplifier 72. The input circuit of the amplifier includes a transformer 71. The transformer 71 in conjunction with a vibrator 64 energized from the same source of alternating-current as the power winding 65 converts the uni-directional un-balance-voltage into alternating current to drive the motor 66 in a direction to adjust contact 68a to reduce to zero the unbalance-voltage.

There is preferably included in the input circuit a filter 63 to eliminate stray-field pick-up of alternating current. Accordingly, as the knob 77 is rotated in one direction, the motor 66 rotates in a selected direction, and as the knob 77 is rotated in the opposite direction the motor 66 is rotated in the opposite direction. In this manner the carriage 80 will be moved to the right or the left as the knob 77 is turned. Accordingly, by driving the chart 36 at a selected speed, determined as by means of the speed-adjusting means 59 operable in conjunction with the variable speed motor 58, an operator turns the knob 77 to keep the dry pen of the carriage 80 on the graph 81. When this graph is of fairly regular shape or is slowly changing, the operator can increase the speed of the chart 36. When the graph is fairly complicated in shape, as appearing in FIG. 5, the speed of the chart 36 will be reduced to make it easier to control the carriage 80 closely to follow all variations in the graph. It has been found that the described arrangement represents a satisfactory way of rapidly tracing velocity logs or records made in velocity-logging of well bores.

The remaining operation of the system to produce the final records 99, 103 and 108 on the recording medium 94 is the same as already described in connection with FIG. 1. However, in FIG. 5 gears 106 have been illustrated for operating the cam 105 and the switch 104 for producing the timing markers 103. The remaining parts have the same reference characters as in FIG. 1.

In some cases it will be desired to generate the synthetic seismogram by means of digital computers rather than in accordance with the system schematically illustrated in FIG. 4. For the foregoing purposes there may be provided as shown in FIG. 6 analog-digital converters 160 and 161 respectively receiving from the driving connection 78 the formation velocity function and from the driving connection or shaft 86 the function varying with total travel time. The digital converters 160 and 161 convert the input data into digital form and respectively operate the printers 162 and 163 to record on a chart 164 the data in digital form which may thereafter be fed into a digital converter. Where it is desired to reproduce the data in digital form on a time base corresponding with that of the field seismogram, the gearing 92 may be utilized for driving by way of the mechanical connection 93 the chart 165. A printer 162a will then reproduce on the chart 165 the formation velocity function in digital form.

From analysis of seismograms it has been found that data may be resolved at each millisecond along the length of a seismogram. Accordingly, data may be fed to the analog-digital converter corresponding with each millisecond of total travel time, which data will be adequate to produce a synthetic seismogram. There are a number of analog-digital converters available on the market and a number of them have been described at pages 385 et seq. of a book entitled "High Speed Computing Devices" (1950) and written by the staff of Engineering Research Associates, Inc.

In FIG. 1 a simple revolution counter of the Veeder-Root type has been illustrated as driven by the output shaft 86. If readings be taken from a revolution counter 49 at a sufficiently rapid rate, incremental travel times can be recorded. The Veeder-Root counter by reason of the ease with which difference in total time can be obtained as between any selected depths, increases the usefulness of the integrator 85.

Referring again to FIG. 1 it will be recalled that the quantity $$\frac{K}{\Delta t}$$

was by the network including resistors 96 and 98 converted to the logarithm of velocity. In one embodiment of the invention the resistor 96 had a value of 760 ohms while the resistor 98 had a value of 500 ohms. By changing the value of the output resistor 98 to 150 ohms there can be obtained a voltage varying in accordance with the formation velocity. Accordingly, by this simple change, there may be obtained on the recording medium 94 a record of velocity as one coordinate and total time as the other coordinate. If desired, the battery 97 may be connected directly across the terminals of the resistor 96 and the output voltage taken from one side thereof to the movable contacts 96a. With this arrangement the output voltage will correspond with change in $\Delta t$ and thus another record of interest with respect to two-way travel time can be secured in accordance with the present invention.

Instead of recording the velocity function as indicated above, it will sometimes be desirable to record average velocity. A record of average velocity may be obtained in manner now to be explained in connection with FIG. 7. In FIG. 7 the parts have been numbered to correspond with the arrangement of FIG. 5, the servo-mechanism 55 being shown as a block and the variable speed motor being indicated by conventional symbol. The output from the shaft 83 through reduction gearing 148 drives through driving connection 149 a movable contact 152a associated with a potentiometer 152. The potentiometer 152 preferably has a plurality of turns. For example, in one embodiment the potentiometer 152 was of the type known on the market as a helipot. It had 40 turns and a resistance of 2,000 ohms. The resistor 152 forms a part of a potentiometer energized by a suitable source of direct current as indicated by the battery 151. A voltage of 150 volts was used for source 151. The output from the potentiometer is applied to a series resistor 154 also comprising a multiple turn resistor of the "helipot" type having 40 turns and a resistance of 2 megohms. The resistor 154 is connected in series with the output resistor 155 which is, in turn, connected to the other side of the potentiometer 152. The galvanometer coil of a galvanometer 101c is connected across the output resistor. This output resistor 155 is made small, say 50 ohms. With the foregoing values for the circuit components, the output across the resistor 155 will correspond with an average velocity function and the graph 156 will be representative thereof. Since the average velocity function is derived from the depth function divided by the total time, it will be understood that at the beginning of the record the contact 152a will be in a position for minimum output from the potentiometer. The galvanometer by mechanical setting has an initial zero position. As the depth increases, the output of the potentiometer increases. While the record 36 of FIGS. 1 or 5 in terms of revolution of the shaft 83 moves at a speed such that each revolution corresponds with a unit of depth, say one revolution per foot of depth of the well, reduction gearing 148 is provided so that for each revolution of the driving connection 149 the contact 152a will complete a turn of the helipot resistor 152 to correspond with 500 feet of depth. Since 40 turns are provided on resistor 152 the average velocity function may be obtained for wells of depth extending to 20,000 feet. Any desired depth may be averaged by changing the number of turns of resistor 152 or by changing the scaling factor.

With the depth function gradually increasing, the contact 154a of the resistor 154 is likewise being moved in a direction to increase the resistance in the circuit. The rate at which this resistance is inserted in the circuit depends, of course, upon the output of the integrator 85 and varies with change in the magnitude of the total time. With the resistors 152, 154 and 155 having the relative values as indicated, the average velocity graph 156 is produced on the recording medium 94. This recording medium is shown as including the other records 108, 99 and 103, though their inclusion is optional and one or more may be omitted.

Now that the principles of the invention have been explained with numerous examples of various forms and modifications thereof, it is to be understood that features of one modification may be utilized in conjunction with other modifications and that further variations will occur to those skilled in the art and within the scope of the appended claims.

In the claims, the term "control function" has been given a broad meaning and is intended to be generic to the Δt function, the velocity function, the logarithm of velocity, and the average velocity function. The depth function of the claims of course refers to the measurement made by the measuring wheel or pulley 42 and to the rotation of shaft 83 of motor 58 which because driving the recording medium or chart 36 having the depth function thereon is representative thereof.

What is claimed is:

1. A data-converting arrangement for a record of acoustic velocity properties of earth strata traversed by a well bore, comprising means for following the variations in said acoustic velocity properties for producing a control function, integrating means coupled to said following means for producing a first function which increases in accordance with the integral of said control function, circuit means connected to and adjustable by said following means for producing the logarithm of the reciprocal of said control function, means coupled to the output of said integrating means for driving a recording medium in response to said first function and at a linear rate twice that of said first function, and recording means responsive to said logarithmic function for recording a trace representative of said logarithmic function on the medium.

2. The arrangement of claim 1 in which said control function is a hyperbolic function of the velocity properties and in which said means for producing said logarithmic function comprises a network including a source of current in series with a fixed resistor and a variable resistor, said variable resistor and said fixed resistor being of the same order of magnitude, and means responsive to said control function for adjusting said variable resistor to produce a current flow through said fixed resistor varying as a function of the logarithm of velocity.

3. In an arrangement for producing data suitable for synthesizing a seismogram from information available from a continuous record of acoustic velocity in which the acoustic velocity appears as a hyperbolic function, a circuit for converting the hyperbolic function into a logarithmic function comprising a source of current in series with a fixed resistor and a variable resistor, means on said variable resistor for adjusting its value, the maximum value of said variable resistor and the value of said fixed resistor bearing a ratio of 30 to 21, and means mechanically connected to said variable resistor adjusting means for adjusting said variable resistor in accordance with the instantaneous value of the hyperbolic function of velocity for producing a current flow through said fixed resistor upon adjustment of said variable resistor which varies as a function of the logarithm of velocity.

4. An arrangement for producing and recording information useful in the interpretation of field seismograms from data available from the acoustic velocity properties of earth strata traversed by a well bore comprising means for generating a control function which varies in relation to a scale corresponding with the depth of the well bore as the incremental travel time of acoustic pulses over short earth segments of constant length at different depths in the well bore, means for generating from said control function a first function which increases in accordance with the integral of said control function with respect to a depth function of the well bore, means for generating from said control function a second function representative of the reflection coefficient of earth strata traversed by the well bore, means for dividing said first function into said depth function of the well bore to produce a third function representative of the average velocity characteristic of the earth strata, means for driving a recording medium in accordance with twice said first function, and means for recording on the medium said second and third functions.

5. A data-converting arrangement for a record of the acoustic velocity properties of earth strata traversed by a well bore appearing on the record with respect to a depth function of the well bore, comprising means operable in opposite directions for following the variations in one direction or the other direction of said record of said acoustic velocity properties for producing a control function, means for moving said record relative to said following means and in direction of said depth function, means coupled to said following means and responsive to said control function for producing a function which varies in accordance with the variation of said control function, means coupled to said record moving means for producing a depth function varying with the depth function of said record, means including an integrating means coupled to said following means and to said depth function producing means and responsive to said control function and to said depth function for producing functions including at least a time-base function, a recorder having a recording medium for recording on the recording medium at least one of the functions selected from said control function and said function varying in accordance with said control function, means connected to said integrating means for driving the recording medium in accordance with said time-base function, means connected to said integrating means and responsive to said time-base function for producing equal time spaced pulses, and means coupled to said pulse producing means for recording said time spaced pulses on said recording medium to provide an indicia of the elapsed time of said time-based function along the length of the recording medium.

6. A data-converting arrangement for a record of the acoustic velocity properties of earth strata traversed by a well bore appearing on the record with respect to a depth function of the well bore, comprising means operable in opposite directions for following the variations in one direction or the other direction of said record of said acoustic velocity properties for producing a control function, means connected to said record for moving said record relative to said following means in direction of said depth function, means coupled to said following means and responsive to said control function for producing a function which varies in accordance with the variation of said control function, means for producing a depth function varying with the depth function of said record, means including an integrating means coupled to said following means and to said depth function producing means and responsive to said control function and to said depth function for producing functions including at least a time-base function, a recorder having a recording medium for recording on the recording medium at least one of the functions selected from said control function and said function varying in accordance with said control function, means connected to said integrating means for driving the recording medium in accordance with said time-base function, means coupled to said integrating means and responsive to said time-base function for producing equal time spaced pulses, means coupled to said pulse producing means for recording said time spaced pulses on said recording medium to provide an indicia of the elapsed time of said time-base function along the length of the recording medium, means coupled to said record moving means and responsive to movement of the record in production of said depth function for generating equal depth spaced pulses, and means interconnecting said depth spaced pulse producing means and said recorder for recording said depth spaced pulses along the length of said recording medium.

7. An arrangement for producing and recording information useful in the interpretation of field seismograms from data available from the acoustic velocity properties of earth strata traversed by a well bore, comprising means for generating a control function which varies in relation to a scale corresponding with the depth of the well bore as the incremental travel time of acoustic pulses over short earth segments of constant length at different depths in the well bore, means coupled to said control function generating means for generating from said control function a first function which increases in accordance with the integral of said control function with respect to a depth function of the well bore, means coupled to said first function generating means for dividing said first function into said depth function of the well bore to produce a second function representative of the average velocity characteristic of the earth strata, a recorder having a recording medium, means interconnecting said first function generating means and said recorder for driving the recording medium in accordance with twice said first function, and means interconnecting said second function generating means and said recorder for recording on the medium said second function.

8. An arrangement for producing and recording information useful in the interpretation of field seismograms from data available from the acoustic velocity properties of earth strata traversed by a well bore, comprising means for generating a control function which varies in relation to a scale corresponding with the depth of the well bore as the incremental travel time of acoustic pulses over short earth segments of constant length at different depths in the well bore, means for generating a depth function, an integrator, means interconnecting said first-named means, said second-named means and said integrator for applying to said integrator said depth function and said control function for generation of a first function which increases in accordance with the integral of said control function with respect to said depth function of the well bore, a network having a source of current and two resistors all in series, said resistors being of the same order of magnitude, means connected to one of said resistors and responsive to said control function for adjusting the value of said one of said resistors in accordance with said control function for production across a second of said resistors of a second function representative of the logarithm of the reciprocal of said control function, means connected to said integrator and said second-named means for dividing said first function into said depth function of the well bore to produce a third function representative of the average velocity characteristic of the earth strata, means connected to said integrator for driving a recording medium in accordance with twice said first function, and means connected to said network and to said dividing means for recording on the medium said second and third functions.

9. An arrangement for producing and recording information useful in the interpretation of field seismograms from data available from the acoustic velocity properties of earth strata traversed by a well bore, comprising means for generating a control function which varies in relation to a scale corresponding with the depth of the well bore as the incremental travel time of acoustic pulses over short earth segments of constant length at different depths in the well bore, means for generating a depth function, an integrator, means interconnecting said first-named and said second-named means for applying to said integrator said depth function and said control function for generation of a first function which increases in accordance with the integral of said control function with respect to said depth function of the well bore, a network having a source of current and two resistors all in series, said resistors being of the same order of magnitude, means connected to one of said resistors and responsive to said control function for adjusting the value of said one of said resistors in accordance with said control function for production across a second of said resistors of a second function representative of the logarithm of the reciprocal of said control function, a recorder having a recording medium, means interconnecting said recorder and said integrator for driving said recording medium in accordance with twice said first function, and means interconnecting said recorder and said network for recording on the medium said second function.

10. An arrangement for producing and recording information useful in the interpretation of field seismograms from data available from acoustic velocity properties of earth strata traversed by a well bore, comprising means for generating a control function which varies in relation to a scale corresponding with the depth of the well bore as the incremental travel time of acoustic pulses over short earth segments of constant length at different depths in the well bore, means for generating a depth function, an integrator, means interconnecting said first-named means, said second-named means and said integrator for applying to said integrator said depth function and said control function for generation of a first function which increases in accordance with the integral of said control function with respect to said depth function of the well bore, means coupled to said first-named means for converting said control function to a second function representative of the reflectivity of the strata traversed by the well bore, a recorder having a recording medium, means interconnecting said recorder and said integrator for driving the recording medium in accordance with said first function, and means interconnecting said recorder and said converting means for recording on the medium said second function.

References Cited in the file of this patent

UNITED STATES PATENTS

| 2,712,694 | Herbold | July 12, 1955 |
| 2,713,147 | Stripling | July 12, 1955 |
| 2,733,510 | Darago | Feb. 7, 1956 |
| 2,768,701 | Summers | Oct. 30, 1956 |

FOREIGN PATENTS

| 522,477 | Canada | Mar. 6, 1956 |

OTHER REFERENCES

Levenstein: "Generating Non-Linear Functions . . ." Tele-Tech & Electronic Industries Magazine, October 1953, pages 76–78.

Peterson et al.: "Synthesis of Seismograms from Well Log Data," Geophysics Magazine, vol. XX, No. 3, July 1955, pages 516–538.